US011780399B2

(12) United States Patent
Hatfield

(10) Patent No.: US 11,780,399 B2
(45) Date of Patent: Oct. 10, 2023

(54) EMBLEM ASSEMBLY IN AIRBAG COVER

(71) Applicant: AUTOLIV ASP, INC., Ogden, UT (US)

(72) Inventor: Mark Hatfield, Providence, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 17/383,809

(22) Filed: Jul. 23, 2021

(65) Prior Publication Data

US 2023/0029371 A1 Jan. 26, 2023

(51) Int. Cl.

*B60R 21/215* (2011.01)
*B60Q 3/283* (2017.01)
*B60Q 3/85* (2017.01)
*B60R 21/203* (2006.01)

(52) U.S. Cl.

CPC ............ *B60R 21/215* (2013.01); *B60Q 3/283* (2017.02); *B60Q 3/85* (2017.02); *B60R 21/2035* (2013.01); *B60R 2021/21543* (2013.01)

(58) Field of Classification Search

CPC .............. B60R 21/215; B60R 21/2035; B60R 2021/21543; B60Q 3/283; B60Q 3/85
See application file for complete search history.

(56) References Cited

U.S. PATENT DOCUMENTS 6,296,380 B1 * 10/2001 Dawli .................... B60Q 3/283 362/253
7,520,528 B2 * 4/2009 Nakamura ............. B60Q 5/003 280/731
8,061,861 B2 11/2011 Paxton et al.
9,067,556 B2 6/2015 Bosch et al.
9,481,297 B2 * 11/2016 Salter ................... H05B 47/105
10,272,836 B2 * 4/2019 Ali ......................... H05K 3/285
10,279,736 B2 5/2019 Schneider et al.
10,696,218 B1 * 6/2020 Kontani ................. B60Q 3/283
(Continued)

FOREIGN PATENT DOCUMENTS

CN 111332218 A * 6/2020
DE 102008057332 A1 * 5/2010 ............. B60Q 3/283
(Continued)

OTHER PUBLICATIONS

Salter, Styuart, 'Machine Translation of RU 2729343 Obtained Jul. 26, 2022', Aug. 6, 2020, Entire Document. (Year: 2020).*
(Continued)

*Primary Examiner* — Laura Freedman
(74) *Attorney, Agent, or Firm* — DICKINSON WRIGHT PLLC

(57) ABSTRACT

An emblem assembly arranged in an airbag cover coupled with a vehicle structure such as a steering wheel in a motor vehicle includes an electronic unit, a decorative unit, and a control device. The electronic unit is held by the airbag cover and has at least one light source. The decorative unit is arranged in the airbag cover and attached to the electronic unit such that the decorative unit covers at least a part of the electronic unit. The control device is electrically connected to the electronic unit and is adapted to control illumination of the decorative unit. Further, at least one light source of the electronic unit is adjusted by the control device arranged in the vehicle structure.

11 Claims, 4 Drawing Sheets

(56) References Cited

U.S. PATENT DOCUMENTS 11,383,639 B1 * 7/2022 Kwon ..................... B60Q 3/64
2006/0125217 A1 * 6/2006 Nakamura ............ B60R 21/203 280/731
2008/0090031 A1 4/2008 Hirzmann
2009/0121459 A1 5/2009 Bostick et al.
2010/0102538 A1 * 4/2010 Paxton .................. B60Q 3/283 428/31
2010/0104780 A1 * 4/2010 Paxton .................. B60R 21/215 156/60
2010/0107806 A1 5/2010 Gino et al.
2010/0194080 A1 * 8/2010 Paxton .................... G09F 21/04 280/728.3
2011/0101654 A1 * 5/2011 Cech .................. B60R 11/0247 381/86
2014/0210190 A1 * 7/2014 Bosch .................. B60R 21/203 280/728.3
2014/0210191 A1 * 7/2014 Bosch .................. B60R 21/203 280/728.3
2015/0375678 A1 * 12/2015 Salter ..................... B60Q 3/283 362/464
2017/0369022 A1 * 12/2017 Kanto .................. B60R 21/215
2019/0210520 A1 * 7/2019 Marc ..................... G09F 13/044
2019/0322211 A1 * 10/2019 Kim ......................... B60Q 3/80
2020/0355867 A1 * 11/2020 Kwon .................... B60Q 3/283
2021/0061189 A1 * 3/2021 Fujimori ............... B60R 13/005
2021/0107400 A1 * 4/2021 Erler ...................... B60Q 3/217
2021/0362668 A1 * 11/2021 Park .................... B60R 21/2165
2022/0063518 A1 * 3/2022 Kim ...................... G09F 21/049
2022/0169196 A1 * 6/2022 Harm .................... B60R 21/203

FOREIGN PATENT DOCUMENTS

DE 102009041712 A1 * 3/2011 ............. B60R 16/06
GB 2473703 A * 3/2011 ............. B60Q 3/283
JP 2009096450 A * 5/2009
RU 2729343 C2 * 8/2020 ........... B60Q 1/1469
WO 2020225243 A1 11/2020
WO WO-2022033498 A1 * 2/2022
WO WO-2022174691 A1 * 8/2022

OTHER PUBLICATIONS

Liang, 'Machine Translation of WO 2022033498 A1 Obtained Oct. 26, 2022', Feb. 17, 2022, Entire Document. (Year: 2022).*

Xu Linlin, 'Machine Translation of WO 2022174691 A1 Obtained Mar. 20, 2023', Aug. 25, 2022, Entire Document. (Year: 2022).*

* cited by examiner

EMBLEM ASSEMBLY IN AIRBAG COVER

TECHNICAL FIELD

This present disclosure relates to an assembly for an illuminated emblem in a vehicle. In particular, the present disclosure relates to the illuminated emblem arranged in an airbag cover of a motor vehicle steering wheel.

BACKGROUND

The statements in this section merely provide background information related to the present disclosure and may not constitute prior art.

Airbag systems including front airbags in a driver side and a passenger side as a safety restraint device are mandatory in motor vehicles sold throughout the world. Further, the front airbag system in the driver side is arranged especially in a steering wheel. In the event of a vehicle impact, the front airbag in the driver side is designed to inflate to protect the occupant from injuries resulting from impact with portions of the steering wheel.

It is also known that most vehicle manufacturers want to have their logo or trademark on the steering wheel as a distinctive design. These logos or trademarks are often illuminated or colored images, and positioned on the steering wheel. In particular, the logos or trademarks are arranged in the steering wheel cover, which is generally used to cover the airbag, i.e., the portion of the steering wheel that is displaced when the airbag is deployed. Such positioning of the logo fosters brand recognition and also helps the vehicle occupant to remember that cars made by the vehicle manufacturer have airbags and are thus safer.

In order to further make the manufacturer's logo stand out, some manufacturers have even begun to seek for ways to illuminate the logo or emblem for providing cosmetic benefits. We have discovered, however, that the illuminated logo or emblem is too bright while driving at night such that the illuminated logo or emblem bothers the driver, and it is not easy to control the illumination of the logo or emblem arranged in the airbag cover because of the complexity of the illuminated logo (emblem) combined with in the airbag system, which is installed in the steering wheel to protect the driver in the event of a vehicle impact.

SUMMARY

The present disclosure relates to an emblem assembly arranged in an airbag assembly, which is coupled to a steering wheel for protecting a driver in a motor vehicle form vehicle impacts. In particular, the emblem assembly is attached to an airbag cover which is generally used to cover a folded airbag in the steering wheel. Further, the logo or trademark of the manufacturers in the emblem assembly is illuminated and the illumination of the logo or trademark is easily and safely adjusted by a control device which is installed in a part of the steering wheel in the motor vehicle because the driver can control the illumination of the logo or trademark without taking the driver's hands off the steering wheel.

In accordance with an exemplary embodiment of the present disclosure, an emblem assembly arranged in an airbag cover coupled to a vehicle structure such as a steering wheel in a motor vehicle includes an electronic unit held by the airbag cover and having at least one light source, a decorative unit arranged in the airbag cover and attached to the electronic unit such that the decorative unit covers at least a part of the electronic unit, and a control device electrically connected to the electronic unit and adapted to control illumination of the decorative unit. The at least one light source of the electronic unit is adjusted by the control device arranged in the vehicle structure (e.g., steering wheel).

In accordance with a further aspect of the present disclosure, the control device is formed with a toggle dimmer switch arranged in the steering wheel and the toggle dimmer switch adjusts a light intensity of the at least one light source of the electronic unit.

In accordance with further aspects of the present disclosure, the control device is formed with various dimmer switches such as a touch dimmer switch, a rotary switch, a touch sensor, or a voice control dimmer, which are each arranged in the steering wheel for adjusting a light intensity of the at least one light source of the electronic unit.

In accordance with a further aspect of the present disclosure, the control device is connected to the electronic unit via an electric cable attached to a body of the airbag cover in the steering wheel. The electronic unit of the emblem assembly is attached to the airbag cover by a form-fitting manner, a force-fitting manner, or an over-molding process. Further, the at least one light source of the electronic unit includes a light emitting diode (LED) having a single color or a Red-Green-Blue (RGB) color for multiple colors and hues.

In accordance with a further aspect of the present disclosure, the electronic unit of the emblem assembly further includes a housing, a circuit board, and a light guide in a packaged configuration. The electronic unit includes a first side and a rear side such that the decorative unit covers at least a part of the front side of the electronic unit.

In accordance with a further aspect of the present disclosure, the decorative unit includes a decorative element and a light diffusing element formed with a transparent or translucent material for transmitting light emitted from the at least one light source of the electronic unit.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
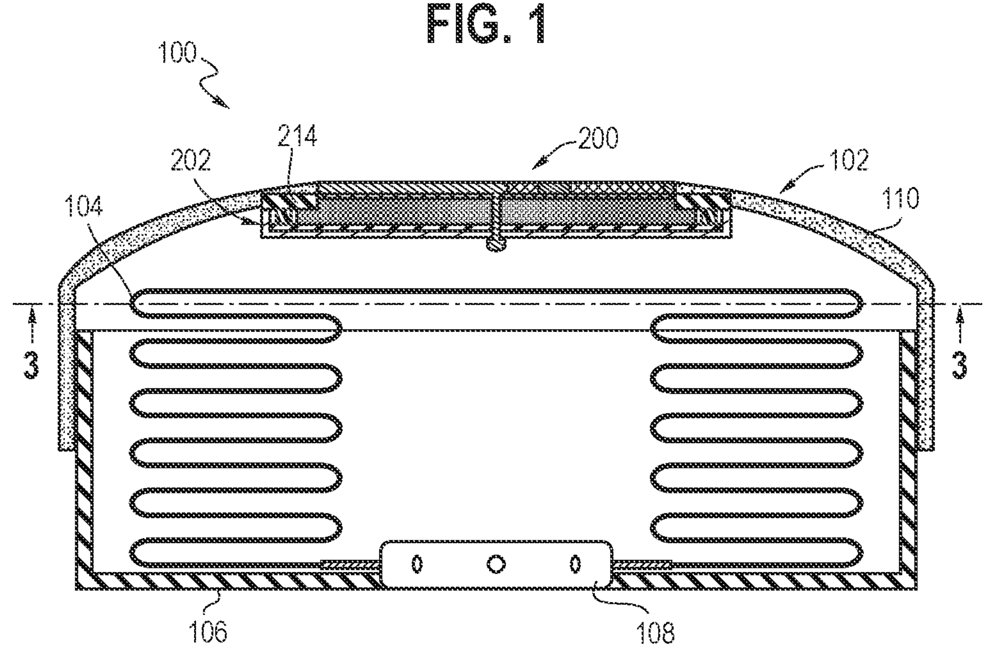
FIG. 1 shows a side sectional view of an emblem assembly attached to an airbag assembly of a steering wheel in a vehicle in accordance with an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an airbag assembly 100 according to an exemplary embodiment of the present disclosure is shown. The airbag assembly 100 includes an airbag cover 102 and an emblem assembly 200. The airbag assembly 100 can be arranged and also used as the part of a vehicle structure such as a steering wheel 10 in a motor vehicle (see FIG. 4A). In another approach, the airbag assembly 100 having the emblem assembly 200 may be arranged in any area of the vehicle where an airbag system such as a front airbag for a passenger, a side airbag (SAB), a knee or center airbag, etc. is located in the vehicle. Further, the emblem assembly 200 having a control device may be separately located in any areas of the vehicle where the occupant may be affected during driving. The airbag assembly 100 is connected to the airbag system by any means known in the art. As shown in FIG. 1, the airbag cover 102 is used to cover an airbag 104, which is folded and stored in an airbag housing 106. In addition, the airbag cover 102 is mounted to the airbag housing 106 of the airbag assembly 100, which further includes the airbag 104 and an inflator 108.

As shown in FIG. 1, the emblem assembly 200 is used to display a logo or trademark, etc. of a vehicle manufacturer and/or vehicle brand. In addition, at least a portion of the emblem assembly 200 is illuminated in order to provide a more distinctive appearance. As shown in FIG. 1, the emblem assembly 200 is connected to a central portion of the airbag cover 102. However, it should be understood that the emblem assembly 200 may be offset from the central portion of the airbag cover 102. Further, the emblem assembly 200 is attached and held by a main body 110 of the airbag cover 102 in a press-fitting manner, a form-fitting manner, an over-molding process, or an adhesive manner.

Figure 2A:
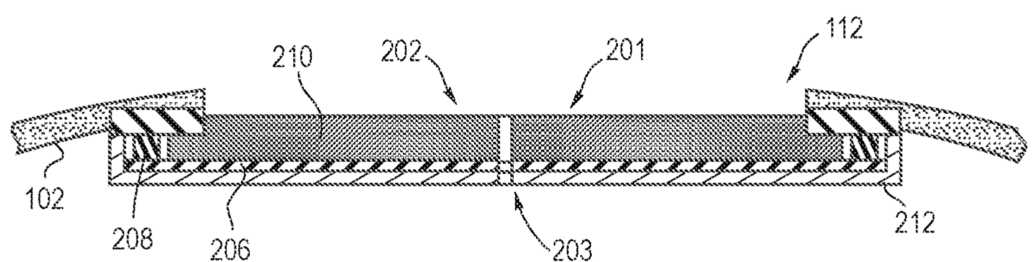
FIG. 2A shows a detailed sectional view of an electronic unit attached unit to an airbag cover of FIG. 1.
Figure 2B:
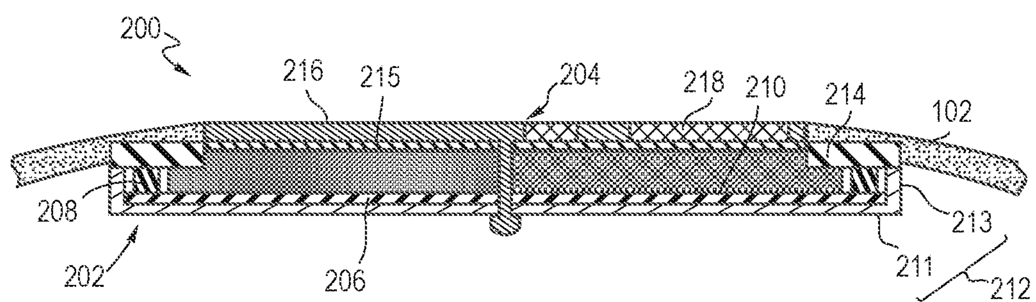
FIG. 2B shows a detailed sectional view of the emblem assembly attached to the airbag cover of FIG. 1.

Referring to FIGS. 2A and 2B, the emblem assembly 200 includes a couple of construction parts such as an electronic unit 202 and a decorative unit 204. The decorative unit 204 is the visible portion of the emblem assembly 200 when it is installed in the vehicle, and the electronic unit 202 serves for illuminating the decorative unit 204. As shown in an exemplary embodiment of FIG. 2A, the electronic unit 202 includes a circuit board 206 (e.g., a printed circuit board (PCB)), a plurality of light emitting diodes (LEDs) 208 used as a light source, a light guide 210, and a housing 212 in a packaged configuration. However, the packaged configuration of the electronic unit 202 may be changed according to other embodiments of the present disclosure.

In FIGS. 2A and 2B, the light guide 210 is made of a common light guiding plastic material, for example amorphous polyamide (PA) and the shape of the light guide 210 is similar to the shape of the circuit board 206. Further, the housing 212 includes a bottom wall 211 and a side wall 213 to receive the circuit board 206, the light source 208, and the light guide 210 to form the packaged configuration of the electronic unit 202. In addition, in order to use the light generated by the light source 206 (e.g., LEDs) efficiently, it is preferred to make the housing from white or light grey plastic material such that its surfaces reflect the light. In an alternative, it would be possible to coat at least parts of the inner surface of the housing with a reflective coating (not shown). Further, the electronic unit 202 includes an end cover 214 having the shape of the bottom wall 211 of the housing 212.

As shown in FIG. 2B, the decorative unit 204 includes a decorative element 216 and a light diffusing element 218. The decorative element 216 includes a visible part 215 having the logo of the car manufacturer, and the light diffusing element 218 is disc-shaped and its diameter corresponds to the diameter of the light guide 210. Further, the light diffusing element 218 includes an area with reduced thickness following the shape of the visible part 215 of the decorative element 216. These two elements 216 and 218 form a decorative unit 204 adapted for being attached to the electronic unit 202 to form the emblem assembly 200.

As described above, in FIGS. 2A and 2B, the circuit board 206, the light source 208, the light guide 210, and the housing 212 are assembled to form the electronic unit 202. For example, the light source 208 attached to circuit board 206 is placed into the housing 212, and the light guide 210 is placed onto the circuit board 206. Finally, the end cover 214 is placed onto the side wall 213 of the housing 212. For example, the end cover 214 can be snapped, glued, or welded to the housing 212 such that the electronic unit 202 of the emblem assembly 200 is formed, and has a front side 201 and a rear side 203. However, the electronic unit 202 may be formed with different structure configurations in accordance with other embodiments of the present disclosure.

Referring back to FIG. 1, the electronic unit 202 is attached to the main body 110 of the airbag cover 102. For example, in FIG. 1, the main body 110 of the airbag cover 102 is injection molded partially around the electronic unit 202. However, as described above, the electronic unit 202 can be attached to the main body 110 of the airbag cover 102 by a form-fitting manner, a force-fitting manner, or an adhesive in accordance with other exemplary embodiments of the present disclosure. Mechanical tabs may be formed for additional containment or molded plastic pins can be reshaped for additional attachment security. For example, the form-fitting manner between the electronic unit 202 and the main body 110 of the airbag cover 102 has the effect that usually the forces acting between those two elements when the airbag 104 deploys are spread over a relatively large area such that this leads to a very safe behavior when the airbag 104 deploys.

As shown in the example of FIG. 1, since the main body 110 of the airbag cover 102 has a hole 112 (see FIG. 2A), the outer surface of the end cover 214 is covered by the main body 110 of the airbag cover 102, but the outer surface of the light guide 210 is uncovered such that the main body 110 covers only a part of the front side 201 of the electronic unit 202. In FIG. 1, the hole 112 is located at the center of the main body 110 to receive the emblem assembly 200. However, the location of the hole 112 to receive the emblem assembly 200 may be changed according to the design of the emblem or logo of the manufacturers.

In FIGS. 2A and 2B, the decorative unit 204 having the decorative element 216 and the light diffusing element 218 is mounted to the uncovered outer surface of the electronic unit 202 through the central hole 112. The decorative unit 204 is attached to the front side 201 of the electronic unit 202 by a form-fitting manner, a force-fitting manner, or an adhesive such that the decorative unit 204 is held at the main body 110 of the airbag cover 102 and the electronic unit 202.

Figure 3:
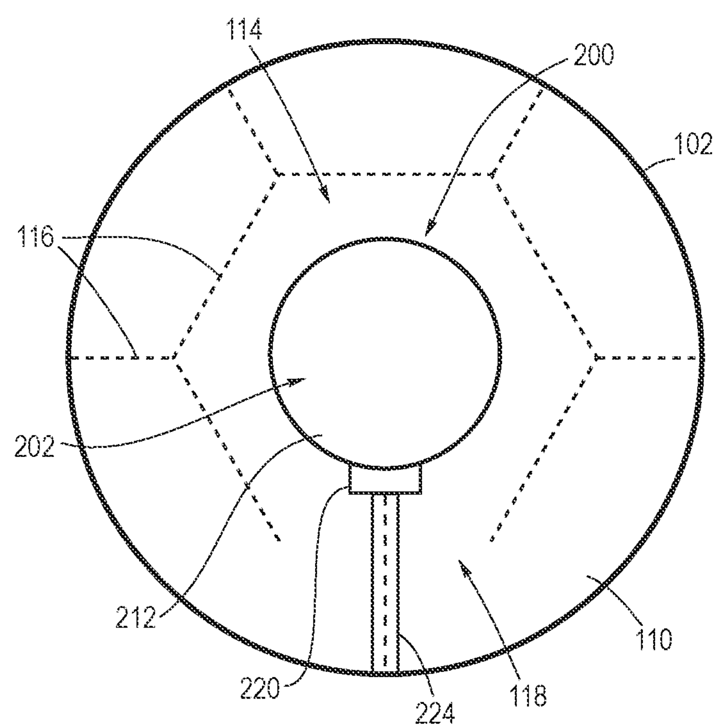
FIG. 3 shows a sectional view taken along plane 3-3 in FIG. 1.
Figure 4A:
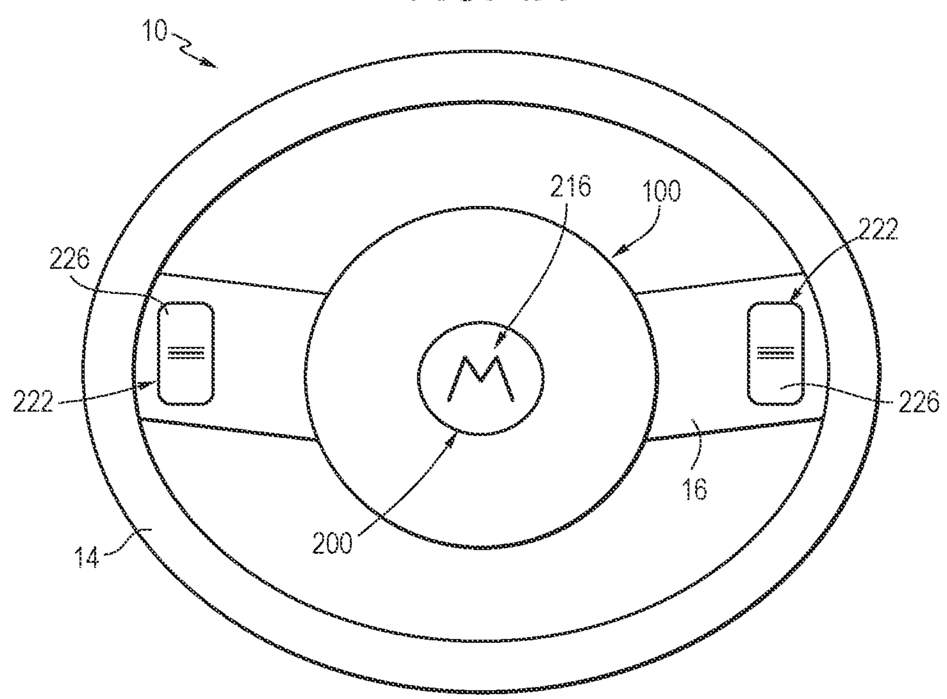
FIG. 4A shows a steering wheel having a control device (a toggle dimmer switch) of the emblem assembly attached to the airbag cover of FIG. 1.

Referring to FIG. 3, the electronic unit 202 further includes a connector 220 formed with the housing 212 for electrically communicating with a control device 222 formed in the steering wheel 10 (see FIG. 4A). At least one electric cable 224 is connected to the connector 220 of the housing 212 and attached to the inner surface of the main body 110 of the airbag cover 102. The connector 220 is configured to attach the electric cable 224 for providing with the electric energy. For example, in FIG. 3, the electric cable 224 is partially molded into the main body 110 (shown in dotted lines in FIG. 3), which is one of the options for assembling the cable 224 with the main body 110 of the airbag cover 102. However, in accordance with other embodiments of the present disclosure, it is possible to glue sections of the cable 224 to the inner surface of the main body 110 in order to define the position of the electric cable 224.

Further, as shown in FIG. 3, the emblem assembly 200 is located in the center portion 114 of the main body 110 in the airbag cover 102, which is surrounded by a break portion 116 of the airbag cover 102 (which is indicated as a dot line) and a non-break portion 118 of the airbag cover 102. When the airbag 104 is deployed, the break portion 116 of the airbag cover 102 is broken and opened for inflating the airbag 104 such that the center portion 114 of the airbag cover 102 including the emblem assembly 200 is opened relative to the non-break portion 118. Accordingly, the emblem assembly 200 and the center portion 114 of the airbag cover 102 can be still held to each other such that the electric cable 224 cannot interfere with the deploying airbag 104 because the attached electric cable 224 extends through the non-break portion 118 of the main body 110 of the airbag cover 102. Further, the electric cable 224 extends radially and is connected to the control device 222. As described above, the electric cable 224 is overmolded into the structure of the steering wheel 10 or glued to the interior side of the steering wheel 10 (not shown).

Referring to FIG. 4A, the steering wheel 10 includes connection the airbag assembly 100, a wheel handle 14 (called as a rim), and a connection member 16, which is formed between the airbag assembly 100 and the wheel handle 14. Further, the emblem assembly 200 includes the control device 222 adapted to control the light intensity of the light source 208 of the electronic unit 202 attached to the main body 110 of the airbag cover 102. The control device 222 is generally located in one of the connection members 16 for easily and safely adjusting the light intensity of the light source 208 of the emblem assembly 200 while the vehicle is driven by an occupant. As shown in an exemplary embodiment of FIG. 4A, since the control device 222 is located near the wheel handle 14, the light intensity of the decorative element 216 (e.g., a logo or trademark of the manufacturers) is safely adjusted without taking the occupant's hands off the wheel handle 14.

Figure 4B:
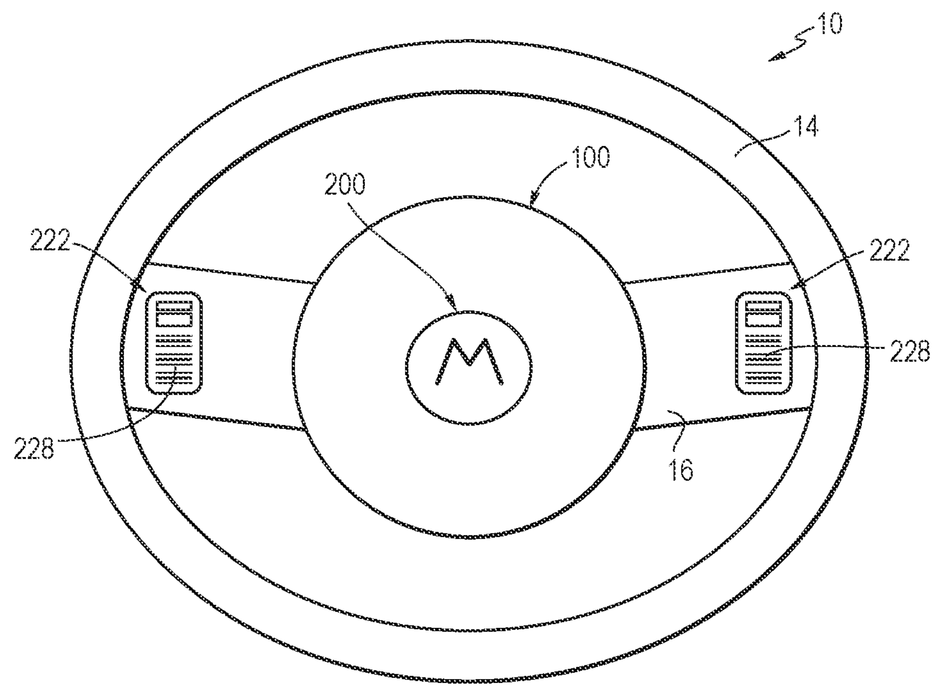
FIG. 4B shows a steering wheel having a touch dimmer switch of the emblem assembly attached to the airbag cover of FIG. 1.
Figure 4C:
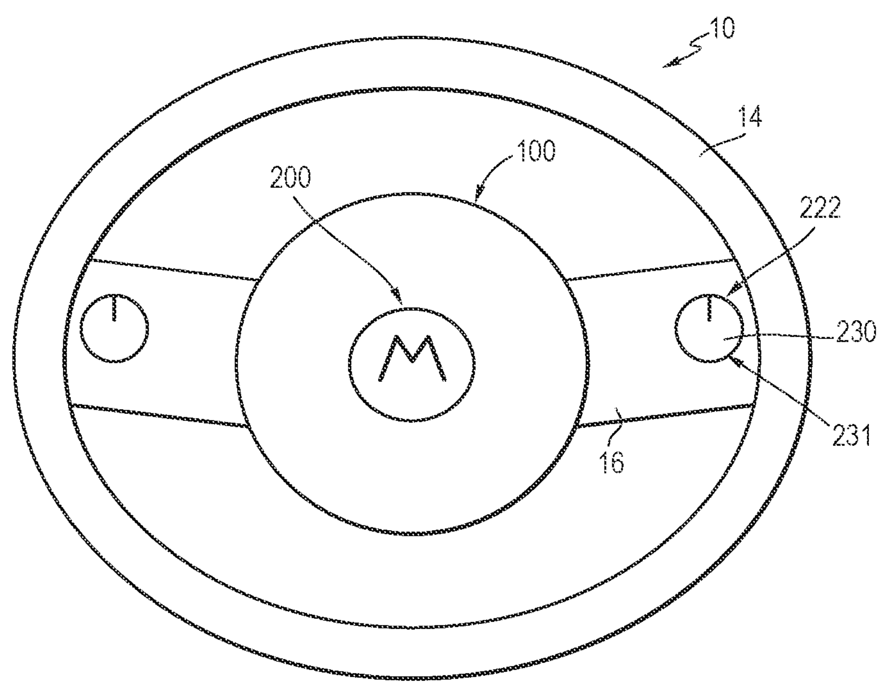
FIG. 4C shows a steering wheel having a rotary switch of the emblem assembly attached to the airbag cover of FIG. 1.
Figure 4D:
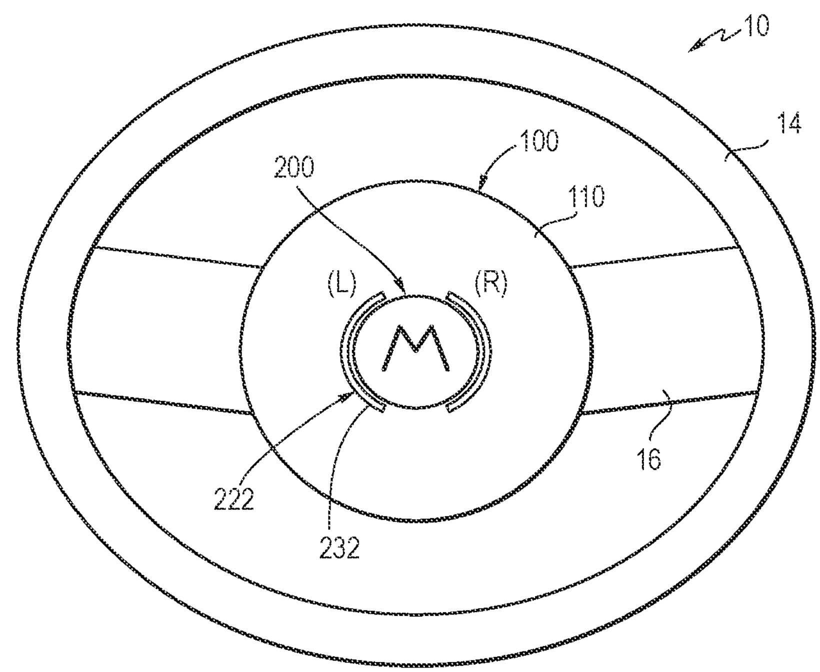
FIG. 4D shows a steering wheel having a touch sensor of the emblem assembly attached to the airbag cover of FIG. 1.
Figure 4E:
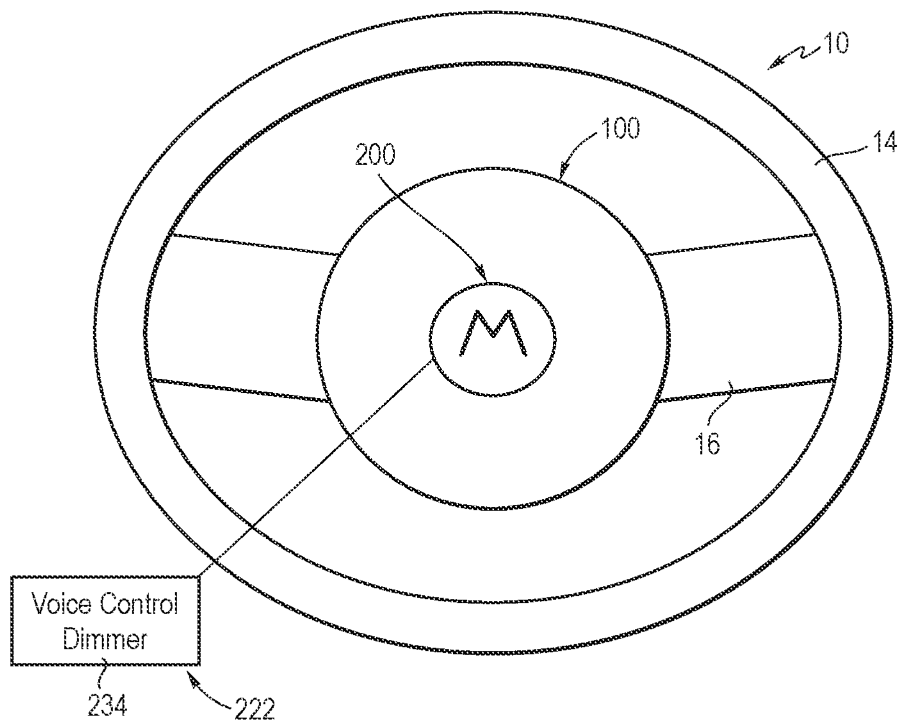
FIG. 4E shows a steering wheel having a voice control dimmer of the emblem assembly attached to the airbag cover of FIG. 1.

As shown in FIGS. 4A-4E, the control device 222 adapted to adjust the light intensity of the light source 208 is connected with the circuit board 206 of the electronic unit 202 via the electric cable 224. In FIGS. 4A-4C, the control device 222 is located in both connection members 16 of the steering wheel 10, but the control device 222 is generally located in one of the connection members 16. The control device 222 has various dimmer switches such as a toggle dimmer switch 226, a touch dimmer switch 228, a rotary switch 230, a touch sensor 232, or a voice control dimmer 234. In another approach, the control device 222 (e.g., the toggle dimmer switch 226, the touch dimmer switch 228, the rotary switch 230, the touch sensor 232, and the voice control dimmer 234, etc.) may also be in a visual display of the vehicle, on the instrument panel, near gear shift to control or anywhere in the drivers, who can easily reach to control the luminosity. According to an exemplary embodiment of FIG. 4A, the control device 222 is formed with the toggle dimmer switch 226 on the connection members 16. One of the toggle dimmer switches 226 increases the light intensity of the light source 208 such that the logo (or emblem) illumination of the emblem assembly 200 gets brighter. Another toggle dimmer switch 226 decrease the light intensity of the light source 208 such that the logo illumination of the emblem assembly 200 gets dimmer and is finally off.

In accordance with other embodiments of the present disclosure, the control device 222 is formed with the touch dimmer switch 228 for adjusting the light intensity of the light source 208 of the emblem assembly 200 (shown in FIG. 4B). The touch dimmer switch 228 is adapted to adjust the light intensity by sliding up or down via touching with hand (shown in FIG. 4B). Further, the control device 222 is formed with the rotary switch 230 adapted to adjust the light intensity of the light source 208 by rotating the circular part 231 (shown in FIG. 4C). In addition, the control device 222 includes the touch sensor 232 formed around the logo or emblem of the emblem assembly 200 attached to the main body 110 of the airbag cover 102. The touch sensor 232 installed around the logo is adapted to adjust the light intensity of the light source 208 via an installed touch mechanism (shown in FIG. 4D). For example, the light intensity of the light source 208 is adjusted by touching the left (L) and the right (R) sides of the logo (emblem) formed with the touch sensor 232. Further, the control device 222 is adapted to adjust the light intensity of the light source 208 via the voice control dimmer 234, which is installed in the circuit board 206 of the emblem assembly 200 or the connection member 16 of the steering wheel 10 (shown in FIG. 4E). For example, the light intensity of the light source 208 is adjusted by the voice of the occupant who operates the vehicle.

While the above description constitutes the preferred embodiments of the present invention, it will be appreciated that the invention is susceptible to modification, variation and change without departing from the proper scope and fair meaning of the accompanying claims.

What is claimed is:

1. An emblem assembly arranged in an airbag assembly having an airbag cover coupled to a steering wheel in a motor vehicle, the emblem assembly comprising:

an electronic unit held by the airbag cover, the electronic unit having at least one light source;

a decorative unit arranged in the airbag cover and attached to the electronic unit, the decorative unit covering at least a part of the electronic unit; and a control device electrically connected to the electronic unit via an electric cable attached to a body of the airbag cover, the control device located in at least one connection member formed between the airbag assembly and a rim and adapted to control illumination of the decorative unit, wherein the at least one light source of the electronic unit is adjusted by the control device arranged in the steering wheel, and wherein the electronic unit further includes a housing, a circuit board, and a light guide in a packaged configuration.

2. The emblem assembly of claim 1, wherein the control device is formed with a toggle dimmer switch arranged in the steering wheel, and the toggle dimmer switch adjusts a light intensity of the at least one light source of the electronic unit.

3. The emblem assembly of claim 1, wherein the control device is formed with a touch dimmer switch arranged in the steering wheel, and the touch dimmer switch adjusts a light intensity of the at least one light source of the electronic unit.

4. The emblem assembly of claim 1, wherein the control device is formed with a rotary switch arranged in the steering wheel, and the rotary switch adjusts a light intensity of the at least one light source of the electronic unit.

5. The emblem assembly of claim 1, wherein the control device is formed with a touch sensor arranged around the decorative unit, and the touch sensor adjusts a light intensity of the at least one light source of the electronic unit.

6. The emblem assembly of claim 1, wherein the control device is formed with a voice control dimmer arranged in the steering wheel, and the voice control dimmer adjusts a light intensity of the at least one light source of the electronic unit.

7. The emblem assembly of claim 1, wherein the electronic unit is attached to the airbag cover by a form-fitting manner, a force-fitting manner, or an over-molding process.

8. The emblem assembly of claim 1, wherein the at least one light source of the electronic unit includes a light emitting diode (LED) having a single color or a Red-Green-Blue (RGB) color for multiple colors and hues.

9. The emblem assembly of claim 1, wherein the electronic unit includes a front side and a rear side such that the decorative unit covers at least a part of the front side of the electronic unit.

10. The emblem assembly of claim 1, wherein the decorative unit includes a decorative element and a light diffusing element formed with a transparent or translucent material for transmitting light emitted from the at least one light source.

11. An emblem assembly arranged in an airbag assembly having an airbag cover coupled to a steering wheel in a motor vehicle, the emblem assembly comprising:

an electronic unit held by the airbag cover, the electronic unit having at least one light source;

a decorative unit arranged in the airbag cover and attached to the electronic unit, the decorative unit covering at least a part of the electronic unit; and a control device electrically connected to the electronic unit via an electric cable attached to a body of the airbag cover, the control device located in at least one connection member formed between the airbag assembly and a rim and adapted to control illumination of the decorative unit, wherein the at least one light source of the electronic unit is adjusted by the control device arranged in the steering wheel, and wherein the at least one light source of the electronic unit includes a light emitting diode (LED) having a single color or a Red-Green-Blue (RGB) color for multiple colors and hues.

* * * * *